US012651760B2

(12) United States Patent
Zhou et al.

(10) Patent No.: US 12,651,760 B2
(45) Date of Patent: Jun. 9, 2026

(54) BATTERY GAS TREATMENT

(71) Applicant: FORD GLOBAL TECHNOLOGIES, LLC, Dearborn, MI (US)

(72) Inventors: Qian Zhou, Northville, MI (US); Gang Guo, Saline, MI (US); Mark Nelson Main, Livonia, MI (US); Kent Snyder, Dearborn, MI (US); Chelsey Ann Rock, Ypsilanti, MI (US); Giovanni Cavataio, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 690 days.

(21) Appl. No.: 17/989,282

(22) Filed: Nov. 17, 2022

(65) Prior Publication Data

US 2024/0170701 A1     May 23, 2024

(51) Int. Cl.
| | |
|---|---|
| *H01M 8/00* | (2016.01) |
| *B01J 23/44* | (2006.01) |
| *B01J 23/72* | (2006.01) |
| *H01M 4/40* | (2006.01) |
| *H01M 8/0612* | (2016.01) |
| *B01J 21/06* | (2006.01) |
| *H01M 4/02* | (2006.01) |

(52) U.S. Cl.
CPC .......... *H01M 8/0618* (2013.01); *B01J 23/44* (2013.01); *B01J 23/72* (2013.01); *H01M 4/405* (2013.01); *B01J 21/066* (2013.01); *H01M 2004/027* (2013.01); *H01M 2004/028* (2013.01)

(58) Field of Classification Search
CPC ........ H01M 8/0612; H01M 4/40; B01J 23/44; B01J 23/72
See application file for complete search history.

(56) References Cited

U.S. PATENT DOCUMENTS

| | | | |
|---|---|---|---|
| 3,939,006 | A | 2/1976 | Kozawa |
| 4,350,745 | A | 9/1982 | Parsen et al. |
| 6,953,637 | B2 | 10/2005 | Hockaday et al. |
| 9,458,542 | B2 | 10/2016 | Suib et al. |
| 9,509,024 | B2 | 11/2016 | Masias |
| 2007/0083073 | A1 | 4/2007 | Bzgherzadeh et al. |
| 2010/0239921 | A1 | 9/2010 | Fan |
| 2011/0159326 | A1 | 6/2011 | Oya et al. |

(Continued)

FOREIGN PATENT DOCUMENTS

| | | | |
|---|---|---|---|
| CN | 112316652 A | 2/2021 | |
| EP | 0527793 B1 | 9/1996 | |
| KR | 20170137997 A | * 12/2017 | .............. H01M 2/34 |

OTHER PUBLICATIONS

Lee et al., Battery Pack, Dec. 2017, See the Abstract. (Year: 2017).*

*Primary Examiner* — Tiffany Legette
*Assistant Examiner* — Monique M Wills
(74) *Attorney, Agent, or Firm* — David B. Kelley; Brooks Kushman P.C.

(57) ABSTRACT

A lithium-ion battery assembly includes a lithium-ion battery pack that produces exhaust gases under stress conditions. Characteristically, the exhaust gases includes carbon monoxide, hydrogen, and hydrocarbons. A catalyst system is in fluid communication with the exhaust gases. Advantageously, the catalyst system configured to promote breakdown of carbon monoxide, hydrogen, and hydrocarbons at temperatures greater than about 100° C.

11 Claims, 2 Drawing Sheets

(56) References Cited

U.S. PATENT DOCUMENTS

2016/0172723 A1* 6/2016 Masias ................ H01M 10/523
429/57
2020/0398683 A1 12/2020 Hermann

* cited by examiner

BATTERY GAS TREATMENT

TECHNICAL FIELD

In at least one aspect, battery gas treatment systems and methods for a lithium-ion battery pack are provided.

BACKGROUND

Lithium-ion battery cells are known to undergo transformations when subjected to stress conditions. For example, when a lithium-ion battery cell is in an abuse condition, it can be exposed to high temperatures (usually 120-150° C.) such that the polyolefin-based separator starts to melt. In such situations, exothermic chemical reactions occur between the electrodes and electrolyte such that gas is generated and the cell's internal temperature starts to rise. If the gas and heat generation rate are higher than the gas and heat dissipation rate, the cell will swell rapidly, and cell temperature will increase significantly. The temperature rise will further increase the chemical reactions, generating even more gas and heat.

Accordingly, there is a need for gas treatment systems and methods that reduces the effects of the gas generated from abuse or situations leading to venting.

SUMMARY

In at least one aspect, a lithium-ion battery assembly that includes a gas treatment component is provided. The lithium-ion battery assembly includes a lithium-ion battery pack that produces exhaust gases under stress conditions. Characteristically, the exhaust gases include carbon monoxide, hydrogen, and hydrocarbons. A catalyst system is in fluid communication with the exhaust gases. Advantageously, the catalyst system is configured to promote breakdown of carbon monoxide, hydrogen, and hydrocarbons at temperatures greater than about 100° C.

In another aspect, the lithium-ion assembly further includes a housing into which the lithium-ion battery pack is positioned, the housing including a vent port through which exhaust gases flow.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

For a further understanding of the nature, objects, and advantages of the present disclosure, reference should be made to the following detailed description, read in conjunction with the following drawings, wherein like reference numerals denote like elements and wherein.

DETAILED DESCRIPTION

Figure 1:
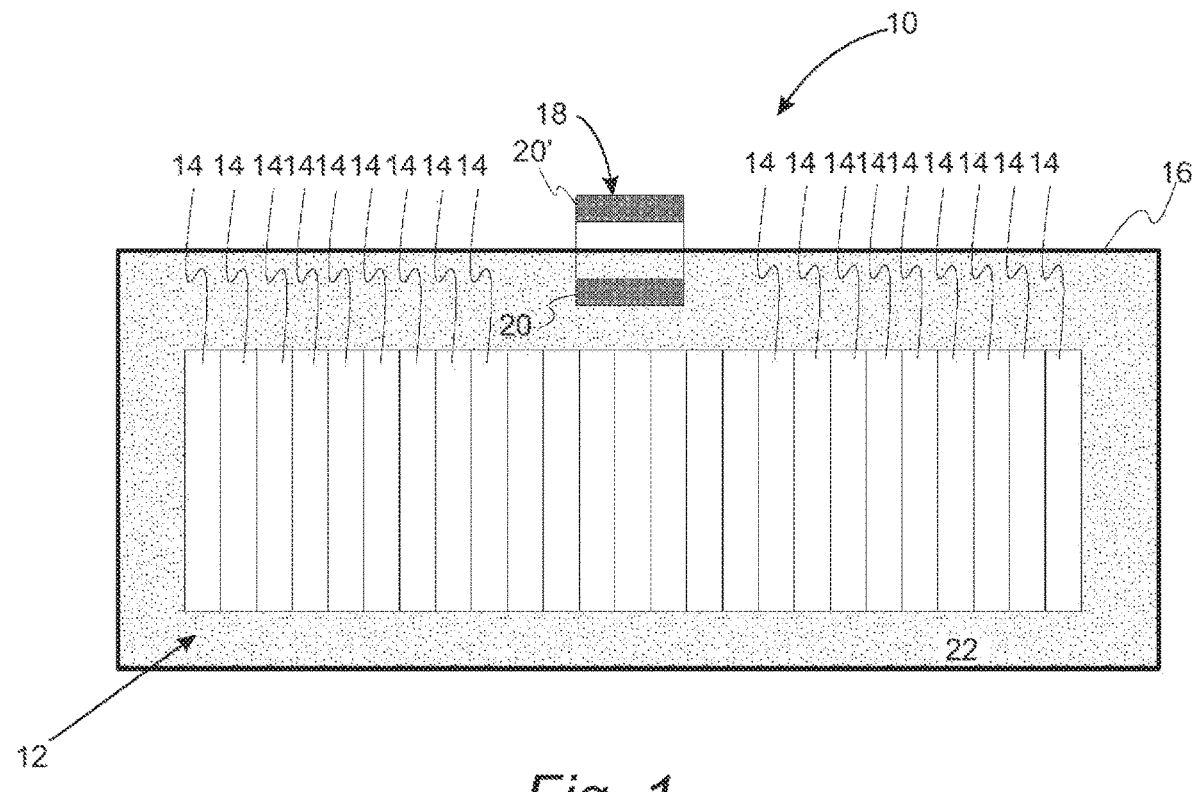
FIG. 1. Schematic a lithium-ion assembly that includes a gas treatment component.

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: when a given chemical structure includes a substituent on a chemical moiety (e.g., on an aryl, alkyl, etc.) that substituent is imputed to a more general chemical structure encompassing the given structure; percent, "parts of," and ratio values are by weight; the term "polymer" includes "oligomer," "copolymer," "terpolymer," and the like; molecular weights provided for any polymers refers to weight average molecular weight unless otherwise indicated; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It must also be noted that, as used in the specification and the appended claims, the singular form "a," "an," and "the" comprise plural referents unless the context clearly indicates otherwise. For example, reference to a component in the singular is intended to comprise a plurality of components.

As used herein, the term "about" means that the amount or value in question may be the specific value designated or some other value in its neighborhood. Generally, the term "about" denoting a certain value is intended to denote a range within +/−5% of the value. As one example, the phrase "about 100" denotes a range of 100+/−5, i.e. the range from 95 to 105. Generally, when the term "about" is used, it can be expected that similar results or effects according to the invention can be obtained within a range of +/−5% of the indicated value.

As used herein, the term "and/or" means that either all or only one of the elements of said group may be present. For example, "A and/or B" shall mean "only A, or only B, or both A and B". In the case of "only A" the term also covers the possibility that B is absent, i.e. "only A, but not B".

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

The phrase "composed of" means "including" or "consisting of." Typically, this phrase is used to denote that an object is formed from a material.

With respect to the terms "comprising," "consisting of," and "consisting essentially of," where one of these three terms is used herein, the presently disclosed and claimed subject matter can include the use of either of the other two terms.

The term "one or more" means "at least one" and the term "at least one" means "one or more." The terms "one or more" and "at least one" include "plurality" and "multiple" as a subset. In a refinement, "one or more" includes "two or more."

The term "substantially," "generally," or "about" may be used herein to describe disclosed or claimed embodiments. The term "substantially" may modify a value or relative characteristic disclosed or claimed in the present disclosure. In such instances, "substantially" may signify that the value or relative characteristic it modifies is within ±0%, 0.1%, 0.5%, 1%, 2%, 3%, 4%, 5% or 10% of the value or relative characteristic.

It should also be appreciated that integer ranges explicitly include all intervening integers. For example, the integer range 1-10 explicitly includes 1, 2, 3, 4, 5, 6, 7, 8, 9, and 10. Similarly, the range 1 to 100 includes 1, 2, 3, 4 . . . 97, 98, 99, 100. Similarly, when any range is called for, intervening numbers that are increments of the difference between the upper limit and the lower limit divided by 10 can be taken as alternative upper or lower limits. For example, if the range is 1.1. to 2.1 the following numbers 1.2, 1.3, 1.4, 1.5, 1.6, 1.7, 1.8, 1.9, and 2.0 can be selected as lower or upper limits.

When referring to a numeral quantity, in a refinement, the term "less than" includes a lower non-included limit that is 5 percent of the number indicated after "less than." For example, "less than 20" includes a lower non-included limit of 1 in a refinement. Therefore, this refinement of "less than 20" includes a range between 1 and 20. In another refinement, the term "less than" includes a lower non-included limit that is, in increasing order of preference, 20 percent, 10 percent, 5 percent, or 1 percent of the number indicated after "less than."

The term "positive electrode" means a battery cell electrode from which current flows out when the lithium-ion battery cell or battery is discharged. Sometimes a "positive electrode" is referred to as a "cathode."

The term "negative electrode" means a battery cell electrode to which current flows in when the lithium-ion battery cell is discharged. Sometimes a "negative electrode" is referred to as an "anode."

The term "cell" or "battery cell" means an electrochemical cell made of at least one positive electrode, at least one negative electrode, an electrolyte, and a separator membrane. In a refinement, the separator membrane can be a hybrid electrolyte system comprised of both solid state and liquid components that simultaneously function as the electrolyte.

The term "battery" or "battery pack" means an electric storage device made of at least one battery cell. In a refinement, "battery" or "battery pack" is an electric storage device made of a plurality of battery cells.

Referring to FIG. 1, a schematic of a lithium-ion battery assembly with a gas treatment component is provided. Lithium-ion battery assembly 10 includes lithium-ion battery pack 12 that produces exhaust gases under stress conditions, the exhaust gases including carbon monoxide, hydrogen, and hydrocarbons. Examples of hydrocarbons include $C_{1-5}$ alkanes and/or $C_{2-6}$ alkenes (e.g., ethylene). In this context, "stress conditions" means that one or more battery cells irreversibly deviate from the designed operation and/or is exposed to high temperatures (e.g., 125° C. or higher depending on the materials of construction). Such temperatures can be about or higher than the melting point of the separator in the battery cells. Lithium-ion battery pack 12 typically includes a plurality of battery cells 14 typically positioned in housing 16. In a refinement, housing 16 includes vent port 18 through which exhaust gases flow. Lithium-ion battery assembly 10 further includes catalyst system 20 and/or 20' which is in fluid communication with the exhaust gases. Battery assembly 10 also includes electrolyte 22 enclosed within each of the individual battery cells 14.

Characteristically, catalyst system 20 is configured to promote the breakdown of carbon monoxide, hydrogen, and hydrocarbons at temperatures greater than about 100° C. Advantageously, catalyst system 20 is configured to convert the exhaust gases to water and carbon dioxide. In this regard, under certain conditions, CO, $H_2$, and hydrocarbons such as $C_2H_4$ can react with oxygen ($O_2$) and be converted to carbon dioxide ($CO_2$) and water ($H_2O$) as described by the following chemical equations $$CO + \tfrac{1}{2}O_2 = CO_2$$

$$H_2 + \tfrac{1}{2}O_2 = H_2O$$

$$C_2H_4 + 3O_2 = 2H_2O + 2CO_2$$

Advantageously, these gases are converted at the early stage while the temperature is still low. This is in contrast to systems without catalysts where high temperatures (>400° C.) is required for the reactions of CO, $H_2$ and $C_2H_4$ with $O_2$ at standard ambient pressure (i.e., 1 atm).

In a variation, the catalyst system includes a catalyst selected from the group consisting of a precious metal catalyst, base metal, and combinations thereof. In a refinement, the catalyst is supported on a support selected from the group consisting of cerium zirconium oxide, silica, alumina, and combinations thereof.

In some refinements, the catalyst system is configured to promote breakdown of carbon monoxide, hydrogen, and hydrocarbons at temperatures from 150 to 350° C. An example of a catalyst system operable in this temperature range are base metal-containing catalysts. In other refinements, the catalyst system is configured to promote breakdown of carbon monoxide, hydrogen, and hydrocarbons at temperatures from 100 to 180° C. An example of a catalyst system operable in this temperature range are Palladium-containing catalysts.

As set forth above, housing 16 includes vent port 18 through which exhaust gases flow. In a refinement, catalyst system 20 and/or 20' is positioned within the vent port. In a further refinement, the catalyst system can be positioned within the vent port and within the housing as depicted by item number 20. Alternatively, the catalyst system can be positioned within the vent port and outside of the housing as depicted by item number 20'. It should be appreciated that a catalyst system can be simultaneously positioned within the vent port inside and outside of the housing.

Figure 2:
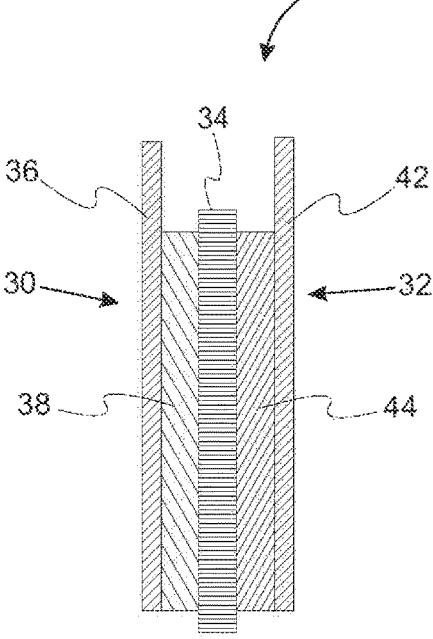
FIG. 2. Schematic cross-section of a battery cell included in the lithium-ion assembly of FIG. 1.

With reference to FIGS. 1 and 2, additional details of the lithium-ion battery assembly are provided. FIG. 2 provides a schematic of a rechargeable lithium-ion battery cell that can be used in the lithium battery assembly of FIG. 1. Battery cell 14 includes positive electrode 30 as described above, negative electrode 32, and separator 34 interposed between the positive electrode and the negative electrode. Positive electrode 30 includes a positive electrode current collector 36 and a positive electrode active material layer 38 disposed over and typically contacting the positive current collector. Typically, positive electrode current collector 36 is a metal plate or metal foil composed of a metal such as aluminum, copper, platinum, zinc, titanium, and the like. Currently, aluminum is most commonly used for the positive electrode current collector. Negative electrode 32 includes a negative electrode current collector 42 and a negative active material layer 44 disposed over and typically contacting the negative current collector. Typically, negative electrode current collector 42 is a metal plate or metal foil composed of a metal such as aluminum, copper, platinum, zinc, titanium, and the like. Currently, copper is most commonly used for the negative electrode current collector. The battery cell is immersed in electrolyte 22 which is enclosed by battery cell case 16. Electrolyte 22 imbibes into separator 34. In other words, the separator 34 includes the electrolyte thereby allowing lithium ions to move between the negative and positive electrodes. The electrolyte includes a non-aqueous organic solvent and a lithium salt, or a hybrid combination of both solid state and liquid components. In the case of implementation of a non-aqueous organic solvent in either scenario, the electrolyte serves as a medium for transmitting ions taking part in the electrochemical reaction of a battery.

Separator 34 physically separates the negative electrode 32 from the positive electrode 30 thereby preventing shorting while allowing the transport of lithium ions for charging and discharging. Therefore, separator 34 can be composed of any material suitable for this purpose. Examples of suitable materials from which separator 34 can be composed include but are not limited to, polytetrafluoroethylene (e.g., TEFLON®), glass fiber, polyester, polyethylene, polypropylene, and combinations thereof. Separator 34 can be in the form of either a woven or non-woven fabric. Separator 34 can be in the form of a non-woven fabric or a woven fabric. For example, a polyolefin-based polymer separator such as polyethylene and/or polypropylene is typically used for a lithium-ion battery. In order to ensure heat resistance or mechanical strength, a coated separator includes a coating of ceramic or a polymer material may be used. For the case of a hybrid combination of both solid state and liquid components, the solid state and liquid component matrix acts as the separator.

Referring to FIGS. 1 and 2, electrolyte 22 within the individual battery cells 14 includes a lithium salt dissolved in the non-aqueous organic solvent. Therefore, electrolyte 22 includes lithium ions that can intercalate into the positive electrode active material during charging and into the anode active material during discharging. Examples of lithium salts include but are not limited to $LiPF_6$, $LiBF_4$, $LiSbF_6$, $LiAsF_6$, $LiC_4F_9SO_3$, $LiClO_4$, $LiAlO_2$, $LiAlCl_4$, LiCl, LiI, $LiB(C_2O_4)_2$, and combinations thereof. In a refinement, the electrolyte includes the lithium salt in an amount from about 0.1 M to about 2.0 M. For the case of a hybrid combination of both solid state and liquid components as the separator, the solid state and/or liquid components of the hybrid combination acts as the electrolyte in the cell active electrodes.

Still referring to FIGS. 1 and 2, the electrolyte includes a non-aqueous organic solvent and a lithium salt. Advantageously, the non-aqueous organic solvent serves as a medium for transmitting ions, and in particular, lithium ions participate in the electrochemical reaction of a battery. Moreover, the non-aqueous organic solvent can be the source of at least a portion of the exhaust gases created during stress conditions. Suitable non-aqueous organic solvents include carbonate-based solvents, ester-based solvents, ether-based solvents, ketone-based solvents, alcohol-based solvents, aprotic solvents, and combinations thereof. Examples of carbonate-based solvents include but are not limited to dimethyl carbonate, diethyl carbonate, dipropyl carbonate, methylpropyl carbonate, ethylpropyl carbonate, methylethyl carbonate, ethylene carbonate, propylene carbonate, butylene carbonate, and combinations thereof. Examples of ester-based solvents include but are not limited to methyl acetate, ethyl acetate, n-propyl acetate, methyl-propionate, ethylpropionate, γ-butyrolactone, decanolide, valerolactone, mevalonolactone, caprolactone, and combinations thereof. Examples of ether-based solvents include but are not limited to dibutyl ether, tetraglyme, diglyme, dimethoxyethane, 2-methyltetrahydrofuran, tetrahydrofuran, and the like, and the ketone-based solvent may include cyclohexanone, and the like. Examples of alcohol-based solvent include but are not limited to methanol, ethyl alcohol, n-propyl alcohol, isopropyl alcohol, and the like. Examples of the aprotic solvent include but are not limited to nitriles such as R—CN (where R is a $C_{2-20}$ linear, branched, or cyclic hydrocarbon that may include a double bond, an aromatic ring, or an ether bond), amides such as dimethylformamide, dioxolanes such as 1,3-dioxolane, sulfolanes, and the like. Advantageously, the non-aqueous organic solvent can be used singularly. In other variations, mixtures of the non-aqueous organic solvent can be used. Such mixtures are typically formulated to optimize battery performance. In a refinement, a carbonate-based solvent is prepared by mixing a cyclic carbonate and a linear carbonate. In a variation, electrolyte 22 can further include vinylene carbonate or an ethylene carbonate-based compound to increase battery cycle life. In other variations, a hybrid combination of both solid state and liquid components can be used.

Referring to FIGS. 1 and 2, the positive electrode active material layer 38 includes the positive electrode active material, a binder, and a conductive material. The binder can increase the binding properties of positive electrode active material particles with one another and with the positive electrode current collector 36. Examples of suitable binders include but are not limited to polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylate styrene-butadiene rubber, an epoxy resin, nylon, and the like, and combinations thereof. The conductive material provides positive electrode 30 with electrical conductivity. Examples of suitable electrically conductive materials include but are not limited to natural graphite, artificial graphite, carbon black, acetylene black, ketjen black, carbon fibers, copper, metal powders, metal fibers, and combinations thereof. Examples of metal powders and metal fibers are composed of including nickel, aluminum, silver, and the like. In the case of the use of hybrid combination of both solid state and liquid components as the electrolyte, the positive electrode active material layer 38 may include the positive electrode active material, and may include a binder, and may include a conductive material, and will include the liquid and/or solid state components of the hybrid electrolyte combination.

Referring to FIGS. 1 and 2, the negative active material layer 44 includes a negative active material, includes a binder, and optionally a conductive material. The negative active materials used herein can be those negative materials known to one skilled in the art of lithium-ion batteries. Negative active materials include but are not limited to, carbon-based negative active materials, silicon-based negative active materials, and combinations thereof. A suitable carbon-based negative active material may include graphite and graphene. A suitable silicon-based negative active material may include at least one selected from silicon, silicon oxide, silicon oxide coated with conductive carbon on the surface, and silicon (Si) coated with conductive carbon on the surface. For example, silicon oxide can be described by the formula $SiO_z$ where z is from 0.09 to 1.1. Mixtures of carbon-based negative active materials, silicon-based negative active materials can also be used for the negative active material. In the case of the use of hybrid combination of both solid state and liquid components as the electrolyte, the negative electrode active material layer 38 may include the negative electrode active material, and may include a binder, and may include a conductive material, and will include the liquid and/or solid state components of the hybrid electrolyte combination.

The following examples illustrate the various embodiments of the present invention. Those skilled in the art will recognize many variations that are within the spirit of the present invention and scope of the claims.

Under certain condition, CO, $H_2$ and $C_2H_4$ can react with oxygen ($O_2$) and convert to carbon dioxide ($CO_2$) and water ($H_2O$).

$$CO + \tfrac{1}{2}O_2 = CO_2$$

$$H_2 + \tfrac{1}{2}O_2 = H_2O$$

$$C_2H_4 + 3O_2 = 2H_2O + 2CO_2$$

Those gases should be converted at the early stage while the temperature is still low. However, without catalyst, high temperature (>400° C.) is required for the reactions of CO, $H_2$ and $C_2H_4$ with $O_2$ at standard ambient pressure.

Figure 3:
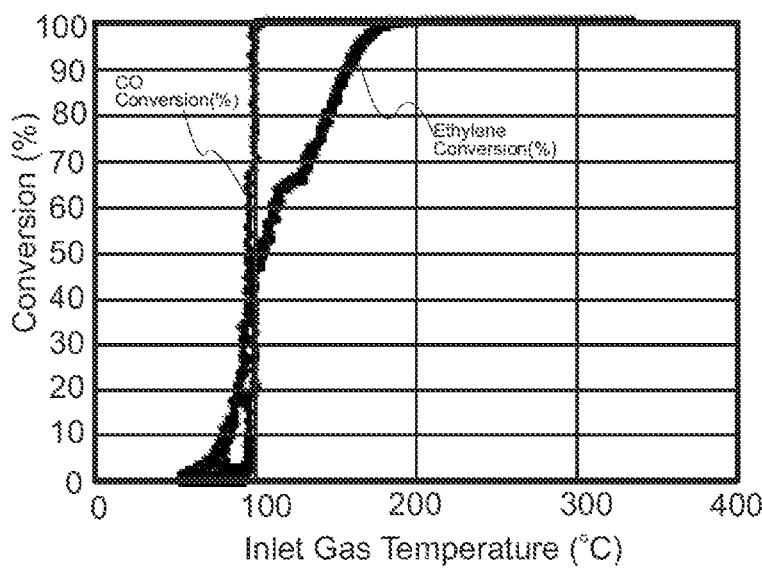
FIG. 3. Conversion of CO and C2H4 on Pd/CZO Catalyst.

With the help of catalyst, those reactions can occur at much lower temperature. FIG. 3. Shows the conversions of CO and $C_2H_4$ vs. temperature with Pd/CZO catalyst. The Pd/CZO is a catalyst with Palladium (Pd) particles deposited on the surface of mixture of cerium oxide and zirconium oxide.

FTIR is used to analyze the gas composition in the reactor. Since $H_2$ can't be analyzed by FTIR, it was not plotted in FIG. 3. Normally, $O_2$ reacts with $H_2$ at lower temperature than with CO on Pd/CZO catalyst.

The data shows that at 100° C., 100% of CO and $H_2$ and 50% of $C_2H_4$ can be converted to $CO_2$ and $H_2O$ with Pd/CZO catalyst. At 200° C., 100% of $C_2H_4$ can be converted.

Figure 4:
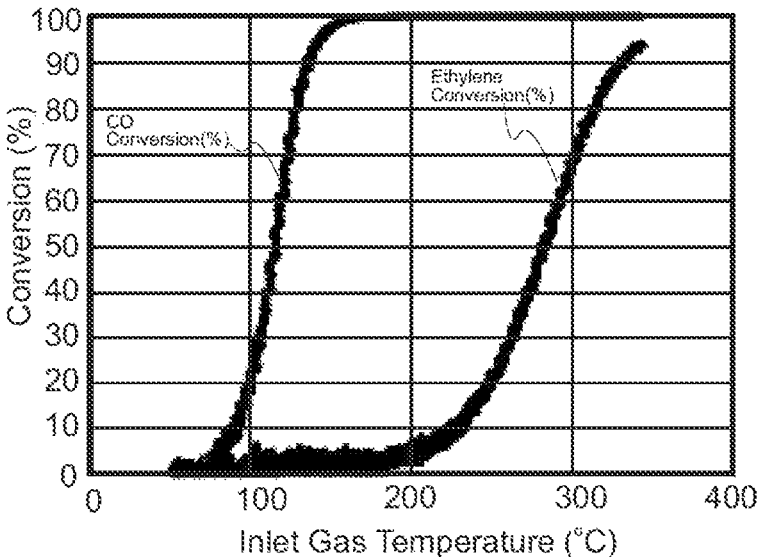
FIG. 4. Conversion of CO and $C_2H_4$ with catalyst Cu/CZO.

Pd is a very effective oxidation catalyst but also a very expensive precious metal. There are other kinds of catalyst which are less expensive, like Cu/CZO. Cu/CZO is a catalyst with Copper (Cu) particles deposited on the surface of cerium and zirconium oxides. FIG. 4 shows the conversions of CO and $C_2H_4$ vs. temperature with Cu/CZO catalyst.

At 150° C., 100% of CO/$H_2$ can be converted to various reaction products. At 300° C., 70% of $C_2H_4$ can be converted to $CO_2$ and $H_2O$. With much less expensive catalyst Cu/CZO, most of CO, $H_2$ and $C_2H_4$ can be converted $CO_2$ and $H_2O$.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A lithium-ion battery assembly comprises:
a lithium-ion battery pack that produces exhaust gases under stress conditions, the exhaust gases including carbon monoxide, hydrogen, and hydrocarbons;
a housing into which the lithium-ion battery pack is positioned, the housing including a vent port that fluidly connects an interior of the housing to ambient atmosphere; and
a catalyst system disposed in the vent port and in fluid communication with the exhaust gases vented from the housing, the exhaust gases including carbon monoxide, hydrogen, and hydrocarbons, wherein the oxidation catalyst system comprises palladium and/or copper dispersed on a cerium-zirconium oxide support and, in the presence of oxygen is configured to convert the carbon monoxide, hydrogen, and hydrocarbons to carbon dioxide and water at temperatures greater than about 100° C.

2. The lithium-ion battery assembly of claim 1, wherein the exhaust gases include $C_{1-5}$ alkanes and/or $C_{2-6}$ alkenes.

3. The lithium-ion battery assembly of claim 1, wherein the catalyst system is configured to promote breakdown of carbon monoxide, hydrogen, and hydrocarbons at temperatures from 150 to 350° C.

4. The lithium-ion battery assembly of claim 1, wherein the catalyst system is configured to promote breakdown of carbon monoxide, hydrogen, and hydrocarbons at temperatures from 100 to 180° C.

5. The lithium-ion battery assembly of claim 1, wherein the catalyst system is positioned within the vent port and within the housing.

6. The lithium-ion battery assembly of claim 1, wherein the catalyst system is positioned within the vent port and outside of the housing.

7. A lithium-ion battery assembly comprises:
a lithium-ion battery pack that produces exhaust gases under stress conditions, the exhaust gases including carbon monoxide, hydrogen, and hydrocarbons;
a catalyst system disposed in the vent port and in fluid communication with the exhaust gases, wherein the oxidation catalyst system comprises palladium and/or copper dispersed on a cerium-zirconium oxide support and, in the presence of oxygen is configured to convert the carbon monoxide, hydrogen, and hydrocarbons to carbon dioxide and water at temperatures less than about 200° C.; and a housing into which the lithium-ion battery pack is positioned, the housing including the vent port port through which exhaust gases flow.

8. The lithium-ion battery assembly of claim 7, wherein the exhaust gases include $C_{1-5}$ alkanes and/or $C_{2-6}$ alkenes.

9. The lithium-ion battery assembly of claim 7, wherein the catalyst system is configured to promote breakdown of carbon monoxide, hydrogen, and hydrocarbons at temperatures from 150 to 350° C. for a copper-containing catalyst or at temperatures from 100 to 180° C.

10. The lithium-ion battery assembly of claim 7, wherein the catalyst system is positioned within the vent port and within the housing.

11. The lithium-ion battery assembly of claim 7, wherein the catalyst system is positioned within the vent port and outside of the housing.

*     *     *     *     *